United States Patent [19]

Cucheran

[11] Patent Number: 5,232,139
[45] Date of Patent: Aug. 3, 1993

[54] SLAT ASSEMBLY FOR VEHICLE ARTICLE CARRIERS

[75] Inventor: John S. Cucheran, Lake Orion, Mich.

[73] Assignee: John A. Bott, Grosse Pointe Shores, Mich.

[21] Appl. No.: 908,639

[22] Filed: Jul. 2, 1992

Related U.S. Application Data

[63] Continuation of Ser. No. 609,824, Nov. 6, 1990, abandoned.

[51] Int. Cl.5 ............................................. B60R 9/00
[52] U.S. Cl. ...................................... 224/324; 224/326
[58] Field of Search .............. 224/326, 325, 321, 309, 224/317, 322, 324, 320, 314

[56] References Cited

U.S. PATENT DOCUMENTS

| Re. 26,539 | 3/1969 | Bott . | |
| 3,253,755 | 5/1966 | Bott . | |
| 3,623,642 | 11/1971 | Stephen . | |
| 3,951,320 | 4/1976 | Bott . | |
| 4,015,760 | 4/1977 | Bott . | |
| 4,055,284 | 10/1977 | Bott . | |
| 4,099,658 | 7/1978 | Bott . | |
| 4,106,680 | 8/1978 | Bott . | |
| 4,156,497 | 5/1979 | Bott . | |
| 4,165,827 | 8/1979 | Bott . | |
| 4,170,322 | 10/1979 | Bott . | |
| 4,174,794 | 11/1979 | Bott . | |
| 4,182,471 | 1/1980 | Bott . | |
| 4,222,508 | 9/1980 | Bott . | |
| 4,239,138 | 12/1980 | Kowalski . | |
| 4,239,139 | 12/1980 | Bott . | |
| 4,266,708 | 5/1981 | Bott . | |
| 4,269,340 | 5/1981 | Kowalski et al. | 224/326 |
| 4,274,568 | 6/1981 | Bott . | |
| 4,274,570 | 6/1981 | Bott . | |
| 4,277,009 | 7/1981 | Bott . | |
| 4,428,517 | 1/1984 | Bott . | |
| 4,431,123 | 2/1984 | Bott . | |
| 4,432,478 | 2/1984 | Bott . | |
| 4,448,336 | 5/1984 | Bott . | |
| 4,460,116 | 7/1984 | Bott . | |
| 4,473,178 | 9/1984 | Bott . | |
| 4,768,692 | 9/1988 | Schneider | 224/326 |
| 4,890,777 | 1/1990 | Bott . | |

Primary Examiner—Linda J. Sholl
Attorney, Agent, or Firm—Harness, Dickey & Pierce

[57] ABSTRACT

The present invention is a slat assembly adapted to be mounted to a surface portion of a vehicle. The slat assembly includes a channel member extending longitudinally and fixedly secured on the surface portion of the vehicle. The channel member includes one or more apertures formed along the channel member. The assembly also includes one or more tie-down members for cooperating with one or more apertures and extending inwardly from the channel member.

10 Claims, 2 Drawing Sheets

5,232,139

SLAT ASSEMBLY FOR VEHICLE ARTICLE CARRIERS

This is a continuation of U.S. patent application Ser. No. 07/609,824 filed Nov. 6, 1990 now abandoned.

BACKGROUND OF THE INVENTION

1. Field of the Invention

The present invention relates generally to an article carrier for vehicles, and more particularly, to a slat assembly for an article carrier on an automotive vehicle.

2. Description of the Related Art

Vehicle article carriers frequently employ two separate subassemblies or portions: a rectangular framework which surrounds the load to be carried and a plurality of slats which rest on the roof or other vehicle body portion and carries the weight of the load. In such constructions, the framework and the slats are often secured to the vehicle body independently of one another. In still another vehicle article or luggage carrier, a crossbar replaces the framework as a means for confining the articles upon the slats.

In prior U.S. Pat. No. 4,182,471, an article carrier for vehicles was disclosed having crossbars which can be adjusted on the slats and are easily removed, interchanged or adjusted in position on the slats in accordance with the needs of the user. This construction has achieved significant commercial success. Nevertheless, a need exists to provide a slat which cooperates with separate tie-down members and is more aesthetically pleasing and simple to assemble. Therefore, it is believed that a need exists for a slat which can be assembled to cooperate with more than one tie-down member and has an attractive appearance of modern article carriers. It is also believed that a need exists for a slat in which the tie-down member can be injection molded. It is further believed that a need exists for a slat which has a predetermined number of apertures to allow a crossbar to be locked or secured in place by positively engaging the apertures to prevent longitudinal movement of the crossbar relative to the slat.

SUMMARY OF THE INVENTION

The present invention is a slat assembly adapted to be mounted to a surface portion of a vehicle. The slat assembly includes means forming a channel member extending longitudinally and fixedly secured on the surface portion of the vehicle. The channel member includes means forming one or more apertures along the channel member. The assembly also includes tie-down means for cooperating with one or more apertures and extending inwardly from the channel member.

One advantage of the present invention is that the slat can be assembled to cooperate with one or more tie-down members. Another advantage of the present invention is that the tie-down member can be injection molded of a plastic material. Yet another advantage of the present invention is that the tie-down members are adapted to cooperate with the slat and provide a slat which is attractive in appearance and has a greater degree of ease of assembly. A further advantage of the present invention is that the slat forms a predetermined number of apertures to allow the crossbar to be locked or secured in place by positively engages the apertures to prevent longitudinal movement of the crossbar relative to the slat.

Other objects, features and advantages of the present invention will be readily appreciated as the same becomes better understood when viewed in light of the following description and accompanying drawings.

DESCRIPTION OF THE PREFERRED EMBODIMENT(S)

Figure 1:
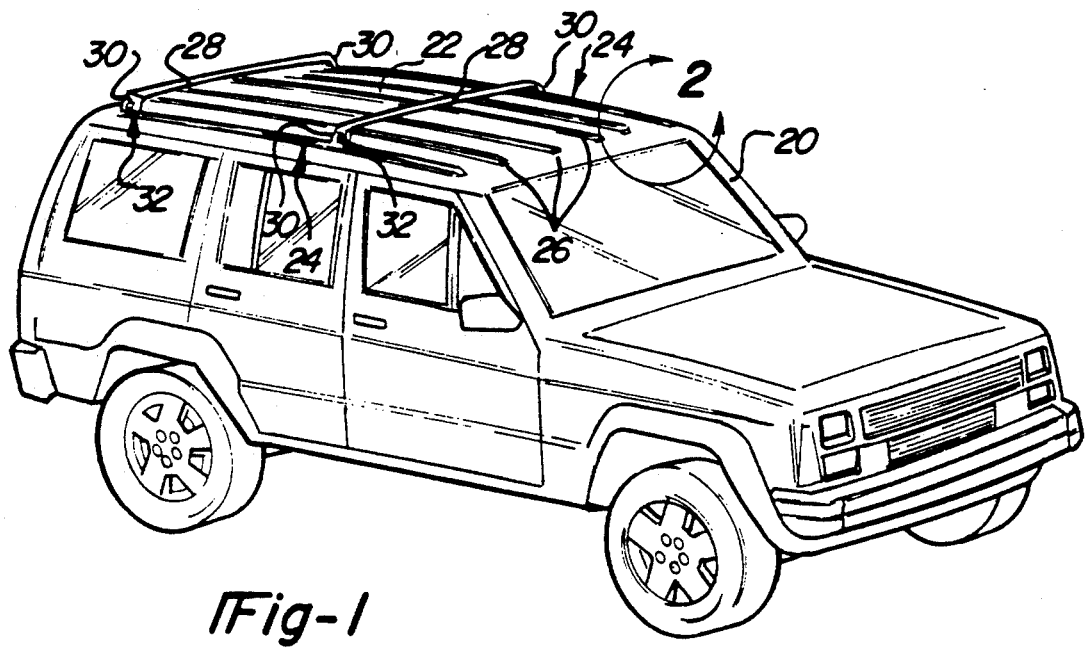
FIG. 1 is a perspective view of a vehicle illustrating an article carrier mounted thereon which is constructed in accordance with the principles of the present invention.

FIG. 1 depicts a vehicle 20 such as an automobile having a generally horizontal roof 22 on which are mounted a pair of identical, parallel, transversely spaced side rails, slats or slat assemblies, generally indicated at 24. Although the slat assemblies 24 are shown mounted on the roof 22, the slat assemblies 24 of the present invention forming an article carrier may be mounted with equal utility on a trunk lid or any other generally horizontal exterior body portion of the vehicle 20. Mounted on the roof 22 are a plurality of identical, parallel, transversely spaced support slats 26. The support slats 26 are disposed between the slat assemblies 24 such that the support slats 26 are transversely spaced between the slat assemblies 24. The slat assemblies 24 and support slats 26 may be secured on the roof 22 by means such as sheet metal screws (not shown), pop rivets, rivet nuts or the like.

Mounted on the slat assemblies 24 are a pair of raised tubular restraining bars or crossbars 28 which are fitted at their opposite ends onto stanchions, bracket members or brackets 30. The brackets 30 include a locking structure, generally indicated at 32, for locking the crossbars 28 into position along the slat assemblies 24. The locking structure 32 allows the crossbars 28 to be positioned operably at predetermined locations along the length of the slat assemblies 24. The locking structure is of the type disclosed in a related application, entitled "VEHICLE ARTICLE CARRIER", filed on the same day as the present application and assigned to the same assignee as the present application, the disclosure of which is hereby incorporated by reference.

Figure 2:
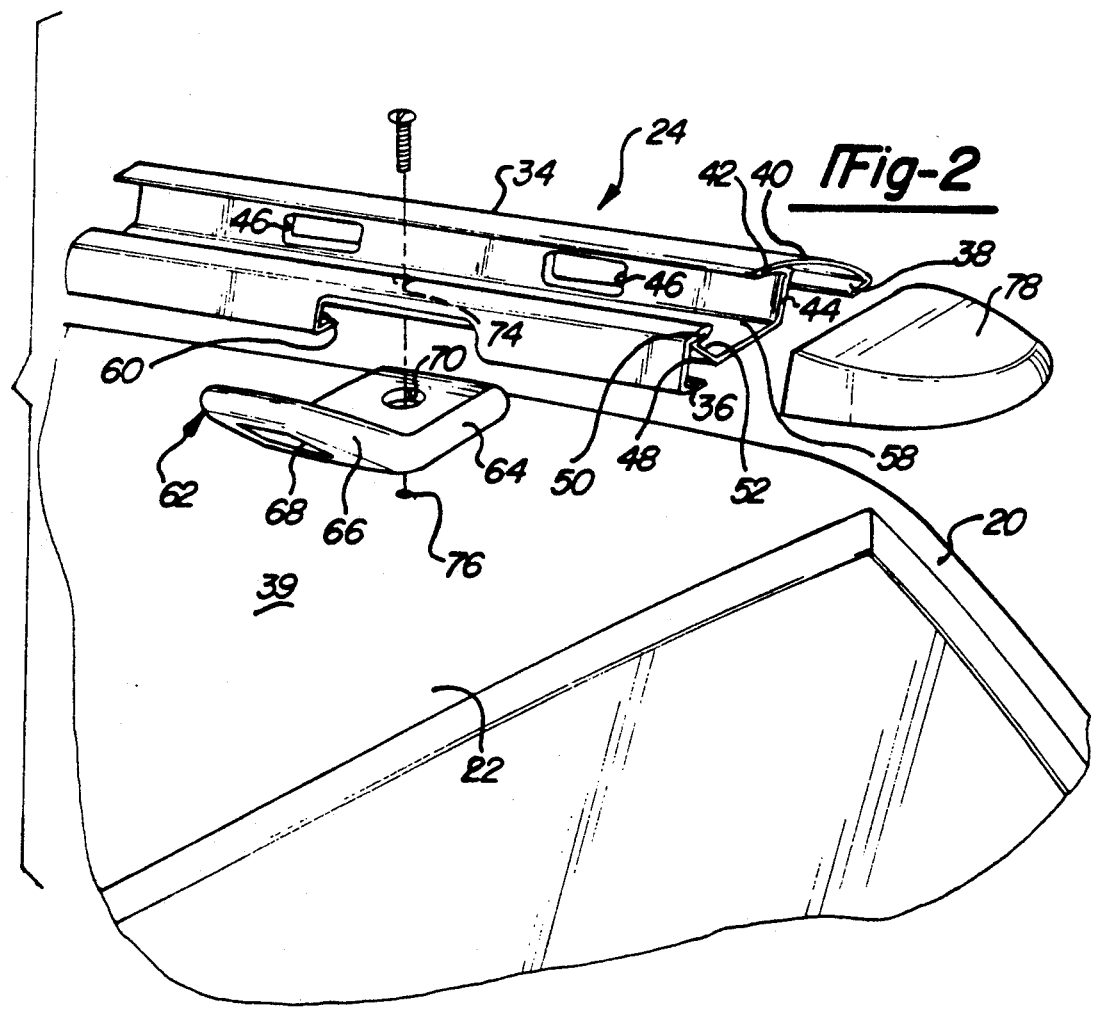
FIG. 2 is an enlarged exploded perspective view of a portion of the structure illustrated in circle 2 for the article carrier of FIG. 1.
Figure 3:
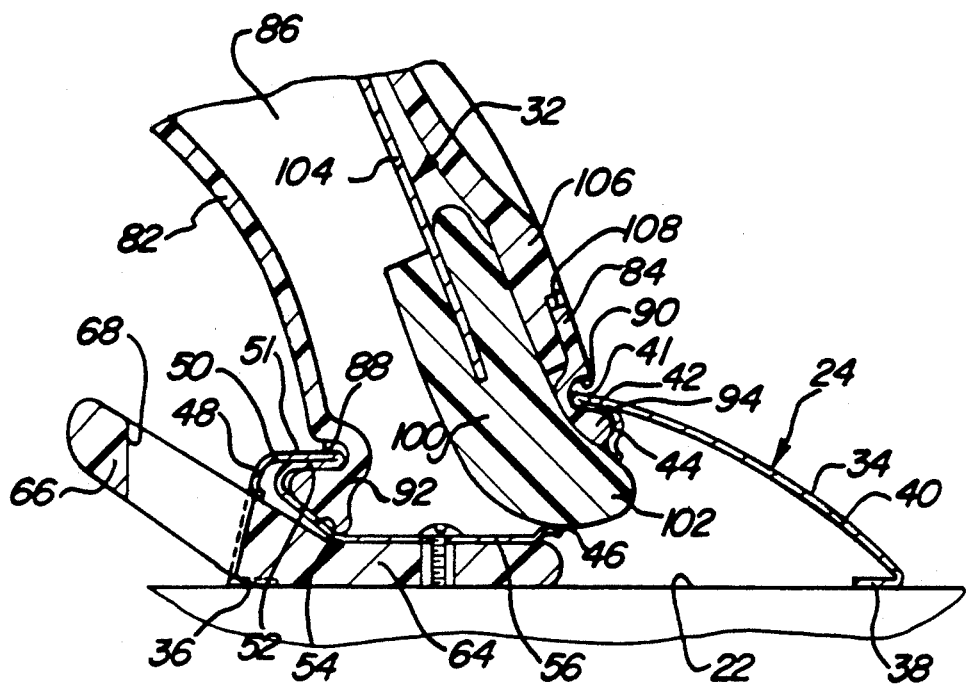
FIG. 3 is a partial fragmentary elevational view of a portion of the structure of FIG. 1 illustrating a member in an engaged position.

Referring to FIGS. 2 and 3, only a portion of the slat assembly 24 and roof 22 are illustrated. The slat assembly 24 includes a generally longitudinally extending channel member 34 having a bottom portion formed by a generally horizontal inner flange 36 and outer flange 38. The inner and outer flanges 36 and 38 are transversely spaced and adapted to rest upon a vehicle body surface 39 of the roof 22. The channel member 34 includes an outer side portion or wall 40 curving gradually upwardly and inwardly in diverging relation to the outer flange 38 and having an article supporting surface 41. The channel member 34 also includes an upper wall 42 extending back beneath the upper end of the outer wall 40 in an overlapping manner. The channel member 34 further includes a channel side wall 44 extending inwardly and downwardly from a free end of the upper wall 42. The side wall 44 includes a plurality of notches or apertures 46 defined therein and spaced along the longitudinal length thereof. The apertures 46 are generally rectangular in shape and extend transversely through the side wall 44. It should be appreciated that the apertures 46 are formed to cooperate with the locking structure 32.

The channel member 34 also includes an inner side portion or wall 48 extending upwardly and inwardly from the inner flange 36. The upper end of the inner wall 48 has a generally horizontal ledge 50 extending transversely inwardly and having an article supporting surface 51. The article supporting surface 51 is spaced generally vertically below the article supporting surface 41. The channel member 34 further includes an upper wall 52 extending back beneath the upper end of the ledge 50 in an overlapping manner. The channel member 34 includes a channel side wall 54 extending inwardly and downwardly from a free end of the upper wall 52 and a bottom wall 56 extends transversely and generally horizontally between the channel side walls 44 and 54. The bottom wall 56, channel side walls 44 and 54 define a channel 58.

The channel member 34 further includes one or more apertures 60 defined in the inner wall 48 and spaced along the longitudinal length thereof. The apertures 60 are generally rectangular in shape and extend transversely through the inner wall 48. It should be appreciated that the apertures 46 are adapted to cooperate with the locking structure 32 of the bracket 30.

The slat assembly 24 includes a tie-down member, generally indicated at 62, which cooperates with the aperture 60 on the inner wall 48 of the channel member 34. The tie-down member 62 has a generally horizontal portion 64 adapted to extend through the aperture 60 and inclined portion 66 extending upwardly at an angle relative to the horizontal portion 64. The inclined portion 66 has a tie-down aperture 68 extending therethrough which is adapted to allow a rope, cord or the like to extend therethrough. The tie-down aperture 68 is generally rectangular in shape. It should be appreciated that the tie-down aperture 68 may have any suitable shape.

Preferably, the horizontal portion 64 extends transversely substantially for a transverse width of the bottom wall 56 and has a thickness less than a thickness for the inclined portion 66. The horizontal portion 64 includes an aperture 70 extending generally therethrough. A fastener 72 extends through an aperture 74 in the bottom wall 56 and the aperture 70 in the horizontal portion 64 and an aperture 76 in the roof 22 to secure or fasten the tie-down member 62 to the roof 22. Alternately, the fastener 72 may be used to secure both the channel member 34 and tie-down member 62 to the roof 22.

Preferably, the channel member 34 is made of a roll formed metal material. The tie-down member 62 is preferably made as a one-piece member from plastic material and formed by injection molding. The slat assembly 24 further includes an end cap 78 adapted to cooperate with the end of the channel member 34. The end cap 79 is adapted to close the end of the channel member 34 when assembled together. It should be appreciated that the walls of the channel member 34 are integral. It should also be appreciated that the article supporting surfaces are adapted to support either the bracket 30 or articles disposed on the slat assembly 24.

Figure 4:
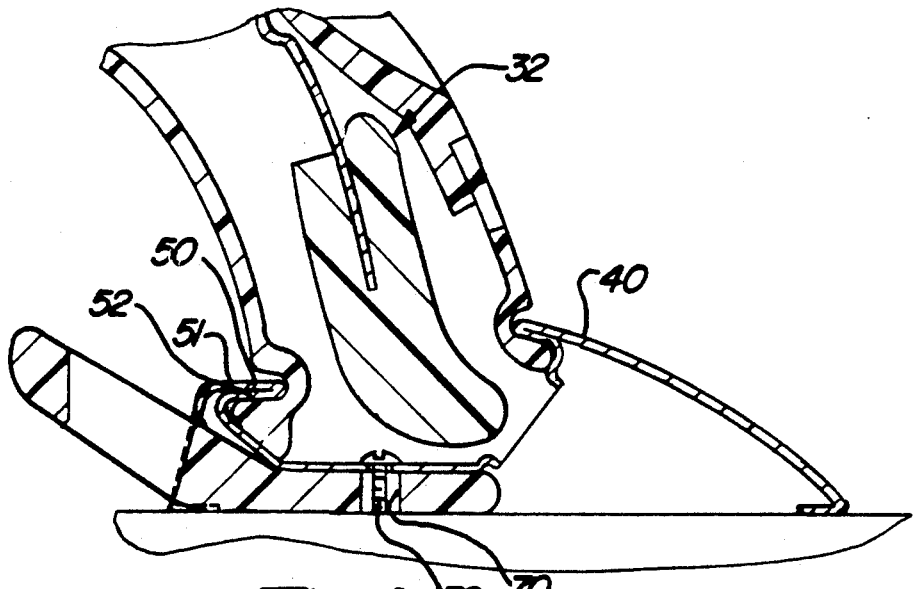
FIG. 4 is a view of the structure similarly illustrated in FIG. 3 with the member in a disengaged position.

As illustrated in FIGS. 3 and 4, the bracket 30 has a generally arcuate shape and inner and outer side walls 82 and 84 which are transversely spaced to form a hollow interior chamber 86. The inner and outer side walls 82 and 84 have a longitudinally and transversely inwardly extending groove 88 and 90 at a lower end thereof. The inner and outer side walls 82 and 84 include transversely extending projections 92 and 94 forming feet portions at the lower end thereof which slide along the channel 58. It should be appreciated that the free ends of ledge 50 and outer side wall 40 are disposed in the grooves 88 and 90, respectively, to prevent relative vertical movement between the bracket 30 and channel member 34.

The locking structure 32 includes a locking member 100 having an outwardly extending finger 102 at the lower end thereof. The locking member 102 is connected to a lower end of a spring member 104. The spring member 104 has an upper end secured by suitable means such as a fastener (not shown) to the bracket 30. The spring member 104 may be made of a flat spring metal material and adapted to flex or move transversely the lower end thereof such that the finger 102 cooperates with the apertures 46 of the channel member 34. The locking structure 32 also includes an actuating member 106 for moving the spring member 104 and locking member 100 such that the finger 102 is moved inwardly and outwardly to disengage and engage the apertures 46. The actuating member 106 is disposed in an aperture 108 in the outer wall 84 and has an upper portion (not shown) adapted to flex or move the spring member 104.

In operation, the finger 102 of the locking member 100 engages an aperture 46 in the channel member 34 to secure the bracket 30 to the channel member 34 when the locking member 100 is in the engaged position as illustrated in FIG. 3. The engagement of the locking member 100 in the aperture 46 prevents the bracket 30 from moving longitudinally relative to the channel member 34. If the actuating member 106 is moved upwardly, the spring member 104 flexes to move the locking member 100 inwardly such that the finger 102 disengages the aperture 46 as illustrated in FIG. 4. The operation may be reversed such that the finger 102 engages the aperture 46.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A slat assembly adapted to be mounted to a surface portion of a vehicle, comprising:

means forming a generally vertically opening channel member extending longitudinally and fixedly secured on the surface portion of the vehicle, said channel member means including means forming one or more apertures therealong in a side portion thereof;

tie-down means having an inclined portion and a horizontal portion for cooperating with said one or more apertures in said channel member means such that said horizontal portion extends inwardly through said side portion of said channel member means and partially underneath a bottom wall of said channel member means to enable a load to be removably secured to said vehicle, said tie-down means being disposed closely adjacent said surface portion of said vehicle such that a lower surface of said horizontal portion is positioned generally flush with a lower edge of said side portion of said channel member means;

said horizontal portion having a first end and second end; said second end of said horizontal portion ending substantially as said one or more apertures; said inclined portion being connected to said second end and extending away from said first end; and fastening means extending through said tie-down means and said bottom wall of said channel member in a direction generally transverse to said surface portion of said vehicle to secure said horizontal portion of said tie-down means and said channel member means to said surface portion of said vehicle.

2. A slat assembly as set forth in claim 1 wherein said tie-down member is made of a plastic material.

3. A slat assembly as set forth in claim 1 wherein said channel member is made of a roll formed metal material.

4. A slat assembly as set forth in claim 1 wherein said channel member comprises a bottom portion, inner and outer side portions extending upwardly from said bottom portion, said one or more apertures extending transversely through said inner side portion.

5. A slat assembly as set forth in claim 4 wherein said tie-down means comprises a tie-down member having a horizontal portion and an inclined portion extending upwardly at an angle relative to said horizontal portion.

6. A slat assembly as set forth in claim 5 wherein said inclined portion includes means forming an aperture extending therethrough.

7. A slat assembly as set forth in claim 6 including fastening means for securing said channel member and tie-down member to the surface portion.

8. A slat assembly as set forth in claim 7 wherein said channel member includes means forming a channel, said channel means having at least one side wall formed with a pluratlity of apertures longitudinally spaced therealong.

9. A slat assembly adapted to be mounted to a surface portion of a vehicle, comprising:

means forming a channel member extending longitudinally and fixedly secured on the surface portion of the vehicle, said channel member means including a bottom wall, a channel side wall and an upper wall, extending upwardly from said bottom wall forming a channel, and an inner wall, and means forming a first plurality of apertures along said channel side wall, and means forming a second plurality of apertures in said inner wall, each one of said second plurality of apertures extending down to a lower edge surface of said inner wall;

tie-down means for cooperating with said one of said pluralities of apertures, said tie-down means comprising a tie-down member having a horizontal portion and an inclined portion extending upwardly at an angle relative to said horizontal portion, said inclined portion including means forming an aperture extending therethrough, said horizontal portion being adapted to extend through one aperture of said second plurality of apertures and underneath said bottom wall;

said horizontal portion having a first end and a second end; said second end of said horizontal portion ending substantially at said one aperture of said second plurality of apertures; said inclined portion being connected to said second end and extending away from said first end; and fastening means extending through said bottom wall and said horizontal portion of said tie-down means for securing said channel member means and said tie-down means to the surface portion.

10. A slat assembly adapted to be mounted to a surface portion of a vehicle, comprising:

means forming a channel member extending longitudinally and fixedly secured on the surface portion of the vehicle, said channel member means including means forming one or more first apertures along said channel member means;

said channel member means including a bottom portion, inner and outer side portions extending upwardly from said bottom portion, and a channel side wall and an inner wall extending downwardly from upper ends of said inner and outer side portions to a bottom wall to define a channel, said channel inner side portion including means forming one or more second apertures extending transversely therethrough and opening along said bottom portion;

at least one tie-down member including a horizontal portion and an inclined portion extending upwardly at an angle relative to said horizontal portion, said inclined portion including means forming an aperture extending therethrough, said horizontal portion of each said tie-down member extending through one of said second apertures of said channel inner side portion and partially underneath said bottom wall, and being adapted to be placed closely adjacent said surface portion of said vehicle and to protrude through one of said first apertures;

said horizontal portion having a first end and a second end; said second end of said horizontal portion ending substantially at said one of said second apertures; said inclined portion being connected to said second end and extending away from said first end; and fastening means for securing both said channel member means and said tie-down member to the surface portion of said vehicle when said horizontal portion of said tie-down member is inserted through said one of said second apertures, said fastening means extending through said bottom portion of said channel member and said horizontal portion into engagement with said surface portion of said vehicle.

* * * * *